May 8, 1956 W. H. PARKER 2,744,365
MACHINE TOOL AND CHUCK THEREFOR
Filed April 3, 1953 2 Sheets-Sheet 1

INVENTOR
WARREN H. PARKER
BY
ATTORNEYS

May 8, 1956  W. H. PARKER  2,744,365
MACHINE TOOL AND CHUCK THEREFOR
Filed April 3, 1953  2 Sheets-Sheet 2
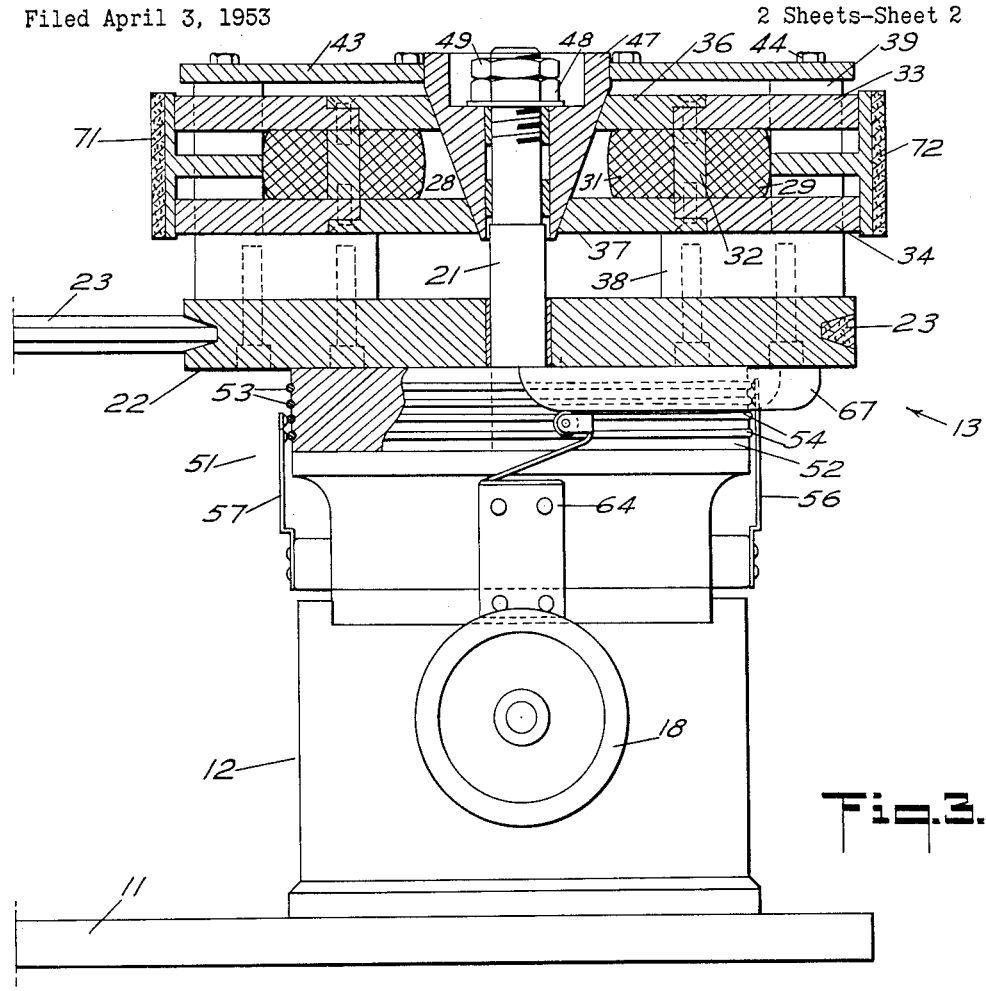
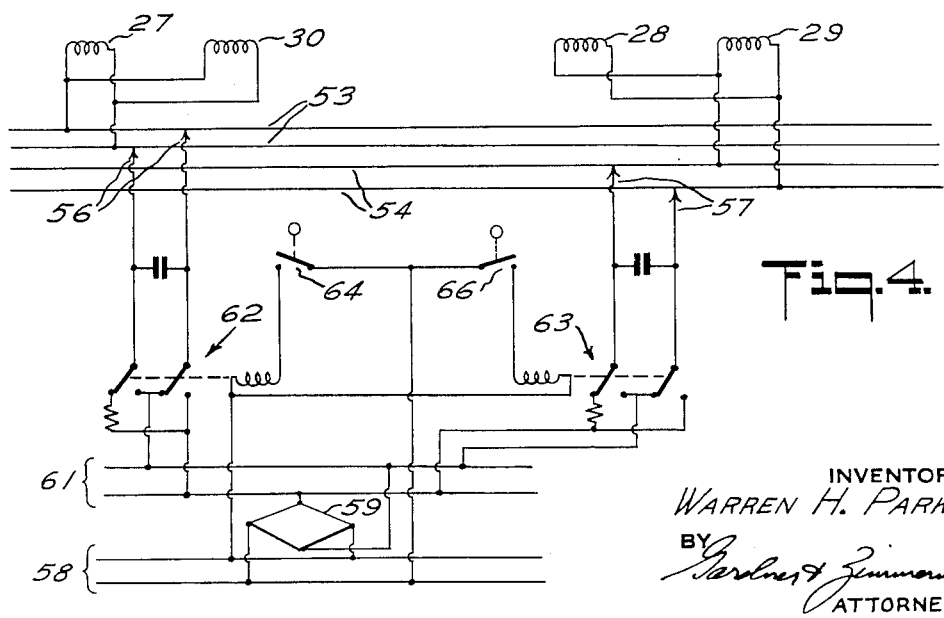
INVENTOR
WARREN H. PARKER
BY
ATTORNEYS

United States Patent Office 2,744,365
Patented May 8, 1956

2,744,365
MACHINE TOOL AND CHUCK THEREFOR

Warren H. Parker, Oakland, Calif., assignor of one-third to Charles W. Butler and one-third to Charles Bork, both of Oakland, Calif.

Application April 3, 1953, Serial No. 346,723

7 Claims. (Cl. 51—237)

The present invention relates to an improved machine tool adapted to rotate material attached thereto and to operate thereon as by grinding and to an improved chuck adapted to releasably retain material upon the machine.

Although there are known a wide variety of machine tools many of these are quite complicated or are not fitted for automatic or semiautomatic operation so that many machining operations are yet accomplished by hand. One such operation is the surfacing of brake shoes which are commonly hand ground upon a powered grinding wheel with the precision of the ground arc and the rapidity of the operation depending upon the practiced eye and skill of the one doing the grinding. The machine tool of the present invention provides for precision grinding of brake shoes, for example, together with the required practically instantaneous attachment and release mechanism in the chuck thereof while at the same time comprising a relatively simple and inexpensive piece of equipment so as to be practical for widespread use. The present invention has of course many uses beyond that of grinding brake shoes, however, inasmuch as this operation is one for which the invention has been found particularly adapted, the invention is herein disclosed with respect to such use.

It is an object of the present invention to provide an improved machine tool for rapidly and accurately operating upon arcuate surfaces.

It is another object of the present invention to provide an improved machine tool of the rotary type having an automatic chuck.

It is a further object of the present invention to provide in a machine tool an improved electromagnetic chuck.

It is still another object of the present invention to provide a machine tool having an improved rotatable chuck including electromagnets and energizing same in accordance with the rotational disposition of the chuck.

It is yet another object of the present invention to provide in a machine tool an improved electromagnetic chuck having radially adjustable means for holding material thereon.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawing and description may be adopted within the scope of the invention as set forth in the claims.

An improved machine tool and chuck therefor embodying the features of the invention is illustrated in the accompanying drawings wherein:

Figure 3 is a sectional view taken at 3—3 of Figure 1.

Figure 4 is a wiring diagram of the chuck shown in Figure 1.

Figure 1:
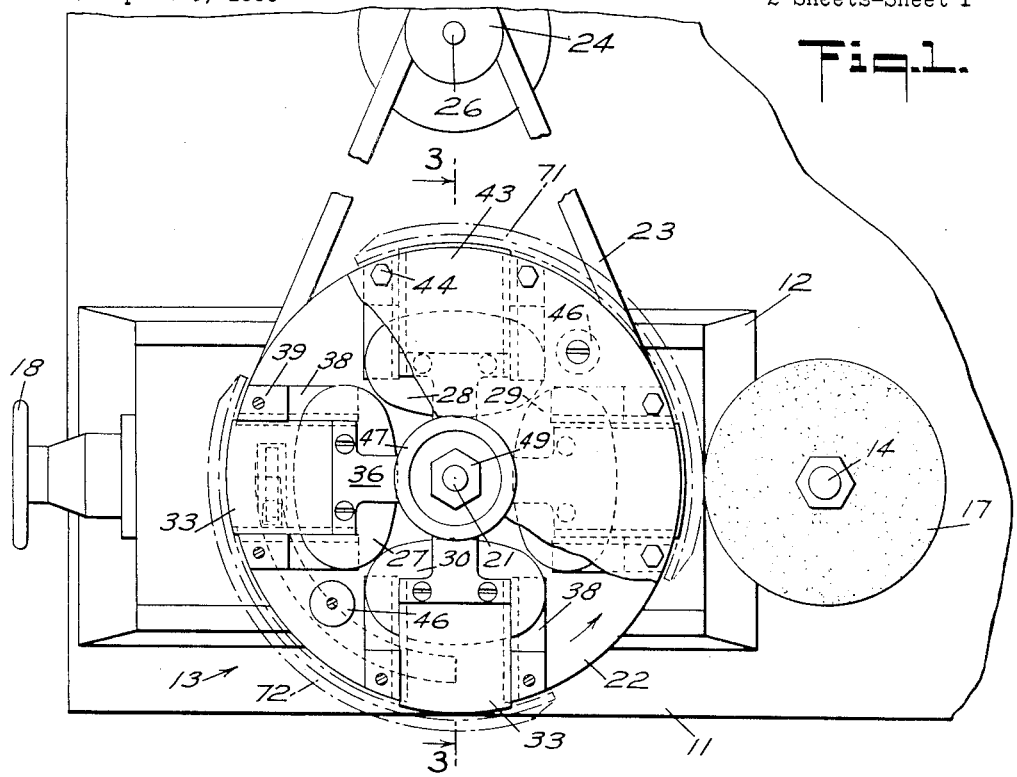
Figure 1 is a plan view of the machine tool.

Considering now the structural features of the illustrated embodiment of the invention, and referring to the drawings, there is provided a foundation plate 11 which is adapted for mounting in a rigid position upon such as a floor or solid legs. There is rigidly mounted upon foundation plate 11 a base member 12 upon which a chuck 13 is secured and there is also attached to foundation plate 11 a shaft or axle 14 which may be mounted thereon by means of a bearing 16 in order that axle 14 is freely rotatable. A top axle 14 there is disposed a cutting or grinding tool which in the present instance will be considered to be a grinding wheel 17 and which is adapted to operate upon material carried by chuck 13. The base member 12 carrying chuck 13 is preferably formed in two parts of which the lower is firmly anchored to foundation plate 11. The upper portion of base member 12 slidably engages the lower portion thereof for movement toward and away from axle 14 and grinder 17 carried thereby for adjusting the relative position of the grinder and chuck 13 carried by the upper portion of base member 12; there being provided conventional adjusting means such as gears or the like controlled by a handwheel 18 for relative movement of the portions of base member 12.

With regard to the structure of chuck 13 there is provided a rigid shaft 21 anchored to the upper portion of base member 12 and extending therefrom parallel to grinder axle 14. There is disposed about shaft 21 a circular base plate 22 which is mounted for rotation thereon as by a bronze bushing or the like and base plate 22 is adapted to be externally powered as through a V-belt 23 disposed within a circumferential V-notch about base plate 22 and extending in tension about a pulley 24 mounted upon a driven shaft 26. The external driven shaft 26 may be powered by any suitable means such as a geared electric motor (not shown) which has a predeterminable speed so that the rotational speed of base member 22 may be maintained constant at a desired value.

There are mounted upon base plate 22 a plurality of electromagnets 27—30, the number of which depends upon the size of the unit and the use to which it is to be put. Each of the electromagnets may be identical and thus considering, for example, magnet 30 it will be seen to include a multi-turn electrical winding 31 wound about a core bar 32 formed of a magnetic material such as iron or the like and having a pair of contact plates 33 and 34 disposed on opposite sides of the winding and extending radially outward of base plate 22. Contact plates 33 and 34 act as channels for directing magnetic flux from the magnet winding 31 and are thus connected one to each end of core bar 32 and are formed of a material that readily conducts magnetic flux, preferably a ferromagnetic material. There are attached to contact plates 33 and 34 a pair of spacer bars 36 and 37 which extend radially inward of base plate 22 from magnet winding 31 toward shaft 21 and there may be provided screw connectors or the like to accomplish the above-noted joinder of contact plates 33 and 34 with core bar 32 and with spacer bars 36 and 37.

The mounting of electromagnets 27—30 upon base plate 22 is accomplished by mounting means for each electromagnet and including, in the case of electromagnet 30 for example, a pair of mounting blocks 38 extending radially of base plate 22 upon the upper surface thereof and securely bolted thereto by bolts extending through base plate 22 and threaded into mounting block 38. Mounting block 38 includes an upright portion at the outer end thereof and, where material such as a brake shoe or the like is to be carried by the chuck 13, these portions may be separated from the lower portions as illustrated and are herein termed upper blocks 39. Mounting blocks 38, including upper blocks 39, are disposed one on each side of contact plates 33 and 34 circumferentially about base plate 22 and in slidable engagement with contact plates 33 and 34. This engagement is provided by a cylindrical bore radially of base plate 22 and parallel thereto along the connecting surfaces of lower mounting blocks 38 and lower contact plate 34 and the connecting surfaces of upper blocks 39 and upper contact plate 33; there being provided dowels 41 within these bores. By this means contact plates 33 and 34 and the entire electromagnet 30 is slidable along mounting blocks 38 and upper blocks 39 radially of base plate 22 and mounting blocks 38 and upper blocks 39 are drilled and tapped transversely to accommodate locking set screws 42 which may be tightened against dowels 41 for locking electromagnet 30 in the desired radial position.

In addition to the above-noted elements of the chuck 13 there is also provided a top plate 43 which is substantially coextensive with base plate 22 and which is secured as by bolts 44 to upper blocks 39. Two or more spacers 46 are provided between top plate 43 and base plate 22 between the electromagnets 27—30 and are secured to both top plate and base plate by bolts or the like to insure the desired separation of these plates. As noted above, the electromagnets 27—30 are mounted upon base plate 22 for radial adjustment and as it is important that each electromagnet and its contact plates be similarly situated upon base plate 22 there is provided means for controlling this adjustment including an adjusting cone 47 which has an axial bore therethrough and is disposed upon shaft 21 with its larger end uppermost. The top larger-diameter end of adjusting cone 47 has a constant diameter portion fitting within an aperture in top plate 43 while spacer bars 36 and 37 of electromagnet 30 and like member of the other electromagnets have the innermost ends thereof bevelled and curved to slidably engage the outer surface of adjusting cone 47; they being disposed perpendicular to the axis of cone 47. The top of shaft 21 is threaded and there is provided in threaded engagement therewith an adjusting nut 48 having a lock nut 49 threaded upon shaft above it and bearing upon cone 47 as through a washer in a depression in the top of cone 47.

Adjustment of the radial position of the electromagnets and the contact plates thereof is accomplished by loosening locking screws 42 on dowels 41 that provide the sliding engagement between the electromagnet 30 and mounting blocks 38 including upper block 39, the other electromagnets being similarly loosened, and then turning adjusting nut 48 upon shaft 21 to force adjusting cone 47 downward thereon. As cone 47 moves downward it forces the electromagnet spacer bars, like spacer bars 37 and 38 of magnet 30, outward to move the electromagnets and their contact plates radially outward until their desired position is reached, and at this position the locking means are tightened to prevent further sliding engagement of the electromagnets and the mounting blocks. This then fixes the radial disposition of the contact plates which are adapted to retain material upon the chuck as noted in more detail below.

Figure 2:
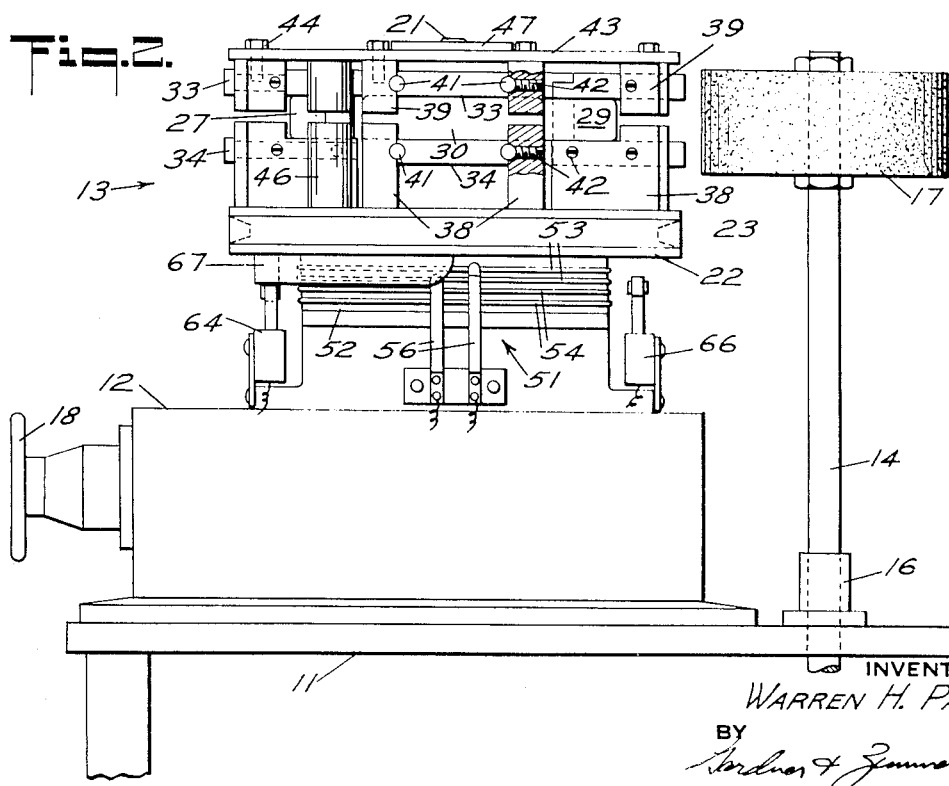
Figure 2 is an elevational view of the machine tool with portions of the chuck broken away as indicated.

Energization of the electromagnets of the chuck 13 is accomplished through slip rings 51 which form a part of the chuck 13 and which operate to alternately energize the electromagnets in accordance with the rotational disposition of the base plate. The electromagnets may be either individually energized or may be energized in groups and in the illustrated embodiment electromagnets 28 and 29 are connected together for simultaneous energization as are electromagnets 27 and 30. Referring to the electrical diagram of Figure 4 and to Figures 2 and 3, it will be seen that electromagnets 28 and 29 are connected in parallel as are electromagnets 27 and 30 and there is provided a wheel 52 attached to the under surface of base plate 22 for rotation therewith and having two pairs of conductors 53 and 54 thereabout, with electromagnets 27 and 30 connected between conductors 53 and electromagnets 28 and 29 connected between conductors 54. Two pairs of brushes or electrical contacts 56 and 57 are mounted upon base member 12 and extend upward therefrom into sliding contact with the individual wires of pairs of conductors 53 and 54 respectively. There is provided an external power supply 58 which may consist of a conventional 115 volt alternating current outlet and a rectifier 59 which may be mounted within base member 12 is connected across power supply 58 to energize a direct current bus 61 as for example with 90 volts direct current energy. The sliding contacts 56 and 57 are each connected through two position relays 62 and 63 respectively across the direct current bus 61 for energizing the electromagnets. The control relays 62 and 63 are each connected across the power supply 58 through switches 64 and 66 respectively and these switches are adapted for automatic control as by having roller actuating arms adapted to contact a cam surface upon base plate 22. Switches 64 and 66 are mounted upon opposite sides of base member 12 with the roller actuating arms thereof extending upward toward base plate 22 and there is provided as the cam surface a projection 67 upon the bottom of base plate 22 aligned to contact the switch actuating arms for depressing same to actuate the relay connected therethrough.

Considering the operation of the above-described electrical portion of the invention, the electromagnets 27—30 are energized from direct current bus 61 from power supply 58 and rectifier 59 through sliding contacts 56 and 57 and pairs of conductors 53 and 54. When the actuating arm of switch 64, for example, makes rolling contact with the projection 67 on base plate 22 and switch 64 is closed current flows from power supply 58 through relay 62 to actuate same and reverse the polarity of the voltage applied to electromagnets 27 and 30. The projection 67 on base plate 22 may extend any desired distance about the circumference of base plate 22 and during this portion of one rotation of the base plate each of the electromagnet pairs alternately has the current therethrough reversed in polarity. The electromagnets 27—30 are so wound and the polarity of the voltage applied thereto is set so that normally the electromagnets produce a flux through the contact plates thereof that attracts and holds magnetic materials such as iron, steel and the like to the contact plates and the reversal of polarity accomplished by the switches 64 and 66 reverses this polarity to repel magnetic materials previously held on the chuck. The brake shoe or other work piece is magnetically held on the two plates such as 33 and 34 and with the plates arranged as shown one of the plates will become a north pole and the other a south pole for one direction of current flow. Correspondingly, the portion of the brake shoe adjacent plate 33 will become an opposite pole to that of its adjacent plate. Therefore, upon a very rapid reversal of magnetic poles on the plates 33 and 34 the poles will change much faster than will the residual magnetism in the brake shoe and therefore there will be two south poles adjacent each other and two north poles adjacent each other and therefore the brake shoe will be repelled or ejected from the chuck.

Considering now the overall operation of the invention in summary, the above-noted adjustments of the chuck 13 and the electromagnets 27—30 are made and the electromagnets are energized. Brake shoes 71 and 72 are then disposed upon chuck 13 with the back rib thereof disposed inwardly of base plate and extending between upper block 39 and mounting block 38. The back of the brake shoe 71 is then in contact with the contact plates of electromagnets 28 and 29 and the magnetic flux produced by the current flowing through the windings of these magnets is channelled by the magnet contact plates through the brake shoe to hold same in intimate contact with the chuck circumferentially about same. The other brake shoe 72 is similarly held in position by electromagnets 27 and 30 and with external drive shaft 26 energized the chuck is rotated by the belt drive to turn the brake shoes past grinder 17 for finishing the brake shoe surface. As the chuck 13 rotates into the position illustrated in the drawings the switch 64 is actuated by contact of its actuating arm with the projection 67 on base plate 22 to reverse the polarity of the voltage applied to electromagnets 27 and 30 through relay 62. This reversal of polarity reverses the direction of the magnetic lines of force of magnets 27 and 30 to effectively reverse the poles thereof so that brake shoe 72 is repelled therefrom and is ejected from the chuck. While the arc upon base plate 22 over which projection 67 extends may be varied to suit the individual application some 90 degrees has been found satisfactory in the illustrated case and after switch 64 is opened by the actuating arm thereof passing out of contact with projection 67 another brake shoe may be inserted upon the chuck for grinding as the chuck continues to rotate past grinder 17. Suitable resistors as shown in Figure 4 may be used to permit sufficient current to flow in either direction so as to accomplish the desired results above described.

What is claimed is:

1. An improved chuck comprising a shaft, a base plate mounted for rotation about said shaft, a plurality of pairs of contact plates mounted upon said base plate for rotation therewith and said pairs of plates each being mounted to slide radially of said base plate, an adjusting cone mounted upon said shaft and controllably movable longitudinally thereof in contact with the inner ends of said contact plates for adjusting the radial position thereof, locking means upon said base plate for securing said contact plates in the radial position determined by said adjusting cone, a plurality of electromagnets disposed upon said base plate with one between the plates of each pair of contact plates, and rotational electrical contacts connected to said electromagnets for energizing same to produce magnetic fields whereby magnetic materials are held against said contact plates to rotate with said chuck.

2. An improved electromagnetic chuck comprising a shaft, a base plate mounted for rotation upon said shaft and having cam surfaces thereon, a plurality of electromagnets mounted upon said base plate and each having a pair of ferromagnetic contact plates extending radially of said base plate for contacting and holding magnetic material to be rotated with said chuck, a plurality of conductors mounted about said shaft for rotation with said base plate and connected to said electromagnets, a plurality of stationary electrical contacts mounted in fixed positions in electrically contacting relation to individual conductors about said shaft for energizing same, and a plurality of cam actuated switches electrically connected to said stationary contacts for energizing same from a power source and said switches engaging said base plate cam surfaces for actuation in accordance with rotational position of said base plate whereby said electromagnets are energized according to their rotational disposition.

3. An improved electromagnetic chuck comprising a base plate mounted for rotation and having a cam surface thereon, a wheel secured to said base plate for rotation therewith and having a plurality of electrical conductors disposed circumferentially thereabout, a plurality of fixed contacts disposed about said wheel in contact with the conductors thereon, a plurality of switches electrically connected to said contactors and adapted for connection to a source of electrical energy, said switches having control means engaging the cam surface of said base plate for actuation in accordance with the rotational disposition of said base plate, a plurality of electromagnets individually connected to the conductors on said wheel, mounting means securing said electromagnets upon said base plate for rotation therewith whereby said electromagnets are energized through said switches in accordance with the rotational disposition of said base plate for releasably holding magnetic material thereto as said base plate is rotated.

4. An improved electromagnetic chuck as claimed in claim 3 further defined by said electromagnets each including a pair of ferromagnetic contact plates disposed one on each side of the electromagnet for contacting magnetic material to be held by the chuck and directing magnetic flux therethrough, and said mounting means including members rigidly affixed radially of said base plate and slidably engaging said electromagnets with locking means thereon whereby the radial extension of said electromagnet contact plates is controllable for adjusting the position of material held by the chuck.

5. An improved electromagnetic chuck comprising a shaft, a base plate mounted for rotation thereon, a plurality of electromagnets disposed circumferentially about said base plate, a plurality of ferromagnetic contact plates extending radially of said base plate from said electromagnets for conducting magnetic flux from said electromagnets whereby magnetic members disposed against said contact plates are held thereby for rotation with the chuck, slip rings about said base plate and connected to said electromagnets, fixed contactors electrically contacting said rings, direct current power supply means, and cam actuated reversing switches connecting said power supply means and said fixed contactors for energizing same in accordance with the rotational disposition of said base plate whereby said electromagnets are operative over a predetermined arc of rotation to hold magnetic members against said contact plates.

6. An electromagnetic chuck comprising a rotatably mounted base plate, a plurality of electromagnets mounted upon said base plate for rotation therewith, a plurality of slip rings mounted for rotation with said base plate and having said electromagnets connected across pairs thereof, power supply means, stationary contacts engaging said slip rings, reversing relay switches connecting said power supply means to said stationary contacts, means defining cam surfaces rotatable with said base plate, and control switches with cam follower actuators engaging said cam surfaces and connected in circuit with said relay switches for reversing same whereby said electromagnets are alternately oppositely polarized.

7. An electromagnetic chuck as defined in claim 6 further characterized by groups of electromagnets circumferentially spaced on said base plate are electrically connected together across individual pairs of slip rings and groups of electromagnets are thereby polarized in accordance with the relative rotational disposition thereof as determined by the engagement of said cam surfaces and cam follower actuators on said control switches.

References Cited in the file of this patent

UNITED STATES PATENTS

| | | |
|---|---|---|
| 513,062 | Sperry | Jan. 16, 1894 |
| 575,210 | Campbell | Jan. 12, 1897 |
| 672,419 | Johnson | Apr. 16, 1901 |
| 981,881 | Rhodes | Jan. 17, 1911 |
| 1,013,574 | Walker | Jan. 2, 1912 |
| 1,333,415 | Henry | Mar. 9, 1920 |
| 1,508,727 | Sheehan | Sept. 16, 1924 |
| 1,628,618 | Spencer | May 10, 1927 |
| 1,671,057 | Brainard | May 22, 1928 |
| 1,816,888 | Arter | Aug. 4, 1931 |
| 2,375,781 | Gilfillan | May 15, 1945 |